US008594387B2

(12) United States Patent
Kobeli et al.

(10) Patent No.: US 8,594,387 B2
(45) Date of Patent: Nov. 26, 2013

(54) TEXT CAPTURE AND PRESENTATION DEVICE

(75) Inventors: Lea Kobeli, San Francisco, CA (US); Evelyne Chaubert, San Francisco, CA (US); Jeffrey Salazar, Palo Alto, CA (US); Gretchen Anderson, San Francisco, CA (US); Ben Foss, San Francisco, CA (US); Matthew Wallace Peterson, San Francisco, CA (US)

(73) Assignee: Intel-GE Care Innovations LLC, Roseville, CA (US)

( * ) Notice: Subject to any disclaimer, the term of this patent is extended or adjusted under 35 U.S.C. 154(b) by 1187 days.

(21) Appl. No.: 11/770,597

(22) Filed: Jun. 28, 2007

(65) Prior Publication Data
US 2008/0260210 A1  Oct. 23, 2008

Related U.S. Application Data (60) Provisional application No. 60/913,486, filed on Apr. 23, 2007.

(51) Int. Cl.
*G06K 9/00* (2006.01)

(52) U.S. Cl.
USPC ........... 382/114; 382/313; 382/321; 382/181; 382/276; 348/62

(58) Field of Classification Search
USPC ......... 382/103, 100, 114, 181, 187, 188, 189, 382/276, 299, 312, 313, 321; 348/62; 704/260, 271
See application file for complete search history.

(56) References Cited

U.S. PATENT DOCUMENTS

| | | | | | |
|---|---|---|---|---|---|
| 3,627,991 | A | * | 12/1971 | Beall | 235/454 |
| 4,514,063 | A | * | 4/1985 | Wang et al. | 353/28 |
| 4,563,771 | A | * | 1/1986 | Gorgone et al. | 382/135 |
| 5,596,656 | A | * | 1/1997 | Goldberg | 382/186 |
| 5,634,084 | A | * | 5/1997 | Malsheen et al. | 704/260 |
| 5,771,071 | A | * | 6/1998 | Bradley et al. | 348/335 |
| 5,875,428 | A | | 2/1999 | Kurzweil et al. | |

(Continued)

FOREIGN PATENT DOCUMENTS

| | | | |
|---|---|---|---|
| KR | 10-2000-0063969 A | | 11/2000 |
| KR | 10-2006-0116114 A | | 11/2006 |
| WO | PCT FI2006/050048 | * | 1/2005 |
| WO | 2009006015 | | 1/2009 |

OTHER PUBLICATIONS

Ball et al. "Co-Design in Synthetic Biology: A System Level Analysis of the Development of an Environmental Sensing Device" (2010) pp. 385-396.*

(Continued)

*Primary Examiner* — Chan S Park
*Assistant Examiner* — Mia M Thomas
(74) *Attorney, Agent, or Firm* — Pillsbury Winthrop Shaw Pittman LLP (57) ABSTRACT

Embodiments of the invention provide devices and methods for capturing text found in a variety of sources and transforming it into a different user-accessible formats or medium. For example, the device can capture text from a magazine and provide it to the user as spoken words through headphones or speakers. Such devices are useful for individuals such as those having reading difficulties (such as dyslexia), blindness, and other visual impairments arising from diabetic retinopathy, cataracts, age-related macular degeneration (AMD), and glaucoma.

18 Claims, 10 Drawing Sheets

(56) References Cited

U.S. PATENT DOCUMENTS

| | | | |
|---|---|---|---|
| 5,942,970 A * | 8/1999 | Norman | 340/407.1 |
| 5,982,911 A * | 11/1999 | Matsumoto et al. | 382/114 |
| 6,014,464 A | 1/2000 | Kurzweil et al. | |
| 6,033,224 A | 3/2000 | Kurzweil et al. | |
| 6,035,061 A | 3/2000 | Katsuyama et al. | |
| 6,052,663 A | 4/2000 | Kurzweil et al. | |
| 6,111,976 A * | 8/2000 | Rylander | 382/114 |
| 6,115,482 A * | 9/2000 | Sears et al. | 382/114 |
| 6,173,264 B1 | 1/2001 | Kurzweil et al. | |
| 6,199,042 B1 | 3/2001 | Kurzweil et al. | |
| 6,246,791 B1 | 6/2001 | Kurzweil et al. | |
| 6,278,441 B1 * | 8/2001 | Gouzman et al. | 345/163 |
| 6,289,121 B1 | 9/2001 | Abe et al. | |
| 6,295,084 B1 * | 9/2001 | Nishizawa et al. | 348/211.1 |
| 6,320,982 B1 | 11/2001 | Kurzweil et al. | |
| 6,324,511 B1 * | 11/2001 | Kiraly et al. | 704/260 |
| 6,542,623 B1 * | 4/2003 | Kahn | 382/114 |
| 6,553,138 B2 * | 4/2003 | Rozin | 382/154 |
| 6,587,583 B1 | 7/2003 | Kurzweil et al. | |
| 6,762,749 B1 * | 7/2004 | Gouzman et al. | 345/163 |
| 6,948,937 B2 * | 9/2005 | Tretiakoff et al. | 434/112 |
| 7,006,665 B2 * | 2/2006 | Olson et al. | 382/101 |
| 7,015,969 B2 * | 3/2006 | Brown et al. | 348/373 |
| 7,123,292 B1 * | 10/2006 | Seeger et al. | 348/218.1 |
| 7,167,604 B2 | 1/2007 | Allen et al. | 382/313 |
| 7,230,538 B2 * | 6/2007 | Lai et al. | 340/573.1 |
| 7,308,114 B2 * | 12/2007 | Takehara et al. | 382/104 |
| 7,325,735 B2 * | 2/2008 | Kurzweil et al. | 235/454 |
| 7,366,339 B2 * | 4/2008 | Douglas et al. | 382/137 |
| 7,403,306 B2 * | 7/2008 | Nakano et al. | 358/1.9 |
| 7,751,092 B2 * | 7/2010 | Sambongi et al. | 358/474 |
| 7,805,307 B2 * | 9/2010 | Levin et al. | 704/260 |
| 8,139,894 B2 * | 3/2012 | Nestares | 382/290 |
| 8,208,729 B2 * | 6/2012 | Foss | 382/181 |
| 8,218,020 B2 * | 7/2012 | Tenchio et al. | 348/211.3 |
| 8,423,076 B2 * | 4/2013 | Kim et al. | 455/550.1 |
| 2001/0026263 A1 * | 10/2001 | Kanamori et al. | 345/156 |
| 2002/0011558 A1 * | 1/2002 | Neukermans et al. | 250/236 |
| 2002/0067520 A1 * | 6/2002 | Brown et al. | 358/906 |
| 2002/0106620 A1 * | 8/2002 | Barnum | 434/306 |
| 2002/0131636 A1 * | 9/2002 | Hou | 382/181 |
| 2002/0196330 A1 * | 12/2002 | Park et al. | 348/49 |
| 2003/0035050 A1 * | 2/2003 | Mizusawa et al. | 348/148 |
| 2003/0048928 A1 * | 3/2003 | Yavitz | 382/114 |
| 2003/0063335 A1 | 4/2003 | Mandel et al. | |
| 2003/0091244 A1 * | 5/2003 | Schnee et al. | 382/321 |
| 2003/0109232 A1 * | 6/2003 | Park et al. | 455/90 |
| 2003/0138129 A1 * | 7/2003 | Olson et al. | 382/101 |
| 2003/0195749 A1 * | 10/2003 | Schuller | 704/258 |
| 2004/0136570 A1 * | 7/2004 | Ullman et al. | 382/114 |
| 2004/0202352 A1 * | 10/2004 | Jones et al. | 382/114 |
| 2004/0205623 A1 * | 10/2004 | Weil et al. | 715/525 |
| 2005/0031171 A1 * | 2/2005 | Krukowski et al. | 382/114 |
| 2005/0052558 A1 * | 3/2005 | Yamazaki et al. | 348/333.12 |
| 2005/0120601 A1 * | 6/2005 | Sadegh et al. | 40/343 |
| 2005/0129284 A1 * | 6/2005 | Campbell | 382/114 |
| 2005/0140778 A1 * | 6/2005 | Kim et al. | 348/14.02 |
| 2005/0145097 A1 * | 7/2005 | Wolberg et al. | 84/486 |
| 2005/0157955 A1 * | 7/2005 | Cervantes et al. | 382/321 |
| 2005/0286743 A1 * | 12/2005 | Kurzweil et al. | 382/114 |
| 2005/0288932 A1 | 12/2005 | Kurzweil et al. | |
| 2006/0008122 A1 * | 1/2006 | Kurzweil et al. | 382/114 |
| 2006/0011718 A1 | 1/2006 | Kurzweil et al. | |
| 2006/0013444 A1 * | 1/2006 | Kurzweil et al. | 382/114 |
| 2006/0013483 A1 | 1/2006 | Kurzweil et al. | |
| 2006/0045389 A1 * | 3/2006 | Butterworth | 382/321 |
| 2006/0054782 A1 * | 3/2006 | Olsen et al. | 250/208.1 |
| 2006/0232844 A1 * | 10/2006 | Nakajima | 359/204 |
| 2006/0261248 A1 * | 11/2006 | Hwang | 250/208.1 |
| 2006/0280338 A1 * | 12/2006 | Rabb | 382/114 |
| 2007/0109417 A1 * | 5/2007 | Hyttfors et al. | 348/211.99 |
| 2007/0230748 A1 * | 10/2007 | Foss | 382/114 |
| 2007/0230749 A1 * | 10/2007 | Foss | 382/114 |
| 2007/0230786 A1 * | 10/2007 | Foss | 382/182 |
| 2007/0280534 A1 * | 12/2007 | Foss | 382/182 |
| 2008/0102888 A1 * | 5/2008 | Sellgren et al. | 455/556.1 |
| 2009/0052807 A1 * | 2/2009 | Kotlarsky et al. | 382/314 |
| 2009/0167875 A1 * | 7/2009 | Ho | 348/207.99 |
| 2009/0169061 A1 | 7/2009 | Anderson et al. | |
| 2009/0169131 A1 | 7/2009 | Nestares et al. | |
| 2009/0172513 A1 | 7/2009 | Anderson et al. | |
| 2009/0197635 A1 * | 8/2009 | Kim et al. | 455/550.1 |
| 2009/0245695 A1 | 10/2009 | Foss et al. | |
| 2009/0268030 A1 * | 10/2009 | Markham | 348/158 |
| 2010/0063621 A1 * | 3/2010 | Pelletier | 700/214 |
| 2010/0111361 A1 * | 5/2010 | Tan et al. | 382/103 |
| 2011/0267264 A1 * | 11/2011 | McCarthy et al. | 345/157 |

OTHER PUBLICATIONS

Anderson et al. "Why Consumers Don't Adopt Smart Wearable Electronics" IEEE CS Wearable Computing (2008) pp. 1-3.*

Anderson et al. "Let's Get Physical" Interactions Sep.-Oct. 2008 pp. 1-5.*

International Search Report/Written Opinion for Patent Application No. PCT/US2008/067237, mailed Oct. 29, 2008, 10 Pages.

* cited by examiner

TEXT CAPTURE AND PRESENTATION DEVICE

CROSS REFERENCE TO RELATED APPLICATIONS

The present application claims the benefit of the earlier filing date of U.S. Provisional Application No. 60/913,486, filed Apr. 23, 2007.

The present application is related to U.S. patent application Ser. No. 11/729,662, entitled "System for Capturing and Presenting Text Using Video Image Capture for Optical Character Recognition," filed Mar. 28, 2007, now pending, U.S. patent application Ser. No. 11/729,664, entitled "Method for Capturing and Presenting Text Using Video Image Capture for Optical Character Recognition," filed Mar. 28, 2007, now pending, U.S. patent application Ser. No. 11/729,665, entitled "Method for Capturing and Presenting Text While Maintaining Material Context During Optical Character Recognition," filed Mar. 28, 2007, now pending, an application (Application No. unknown) entitled "System for Capturing and Presenting Text While Maintaining Material Context During Optical Character Recognition," filed Mar. 28, 2007, now pending, and PCT application No. PCT/US07/65528, entitled "Capturing and Presenting Text Using Auditory Signals," filed Mar. 28, 2007, which claim the benefit of provisional application Nos. 60/811,316, filed Jun. 5, 2006 and 60/788,365, Filed Mar. 30, 2006, the disclosures of which are incorporated herein by reference.

BACKGROUND OF THE INVENTION

1. Field of the Invention

The embodiments of the present invention relate generally to the area of adaptive devices designed to aid individuals having one or more impairments, such as, for example dyslexia or low vision. More specifically, embodiments of the invention relate to systems and devices that are capable of transforming printed text obtained from a variety of sources or media formats into more user-accessible forms.

2. Background Information

The conveyance of information through text-based media is a ubiquitous phenomena in society. For some, however, the ability to acquire information contained in text-based media can be a daunting if not impossible task. Such individuals include, for example, those having learning difficulties, blindness, and visual impairments such as those arising from diabetic retinopathy, cataracts, age-related macular degeneration (AMD), and glaucoma.

Recent studies indicate that at least one in twenty individuals has dyslexia, a reading disability and the most common type of recognized learning disability (LD), and at least one in ten is affected with other forms of LD that limit the ability to read or write symbols. Reading-related LDs are genetic neurophysiological differences that affect a person's ability to perform linguistic tasks such as reading and spelling. A disability can vary across a population, exhibiting varying degrees of severity and amenability to remediation. The precise cause or pathophysiology of LDs such as dyslexia remains a matter of contention. Current efforts to remediate reading difficulties, such as dyslexia, fall short of remedying the difficulty in a large proportion of affected individuals. Further, the lack of systematic testing for the disability leaves the condition undetected in many adults and children.

In addition to the LD population, there is a large and growing population of people with poor or no vision. As the populations in many countries age, the low/no vision population is increasing. Difficulties in reading can interfere with performance of simple tasks and activities, and deprive affected individuals of access to important text-based information. Thus a need exists to provide individuals who are unable to read well or at all with the ability to garner information from text-based sources.

DETAILED DESCRIPTION OF THE INVENTION

Embodiments of the invention provide methods, systems, and apparatuses, including graphical user interfaces and output capabilities, for capturing and presenting text to a user. Embodiments of the invention facilitate the capture of text from a source, such as for example, a magazine, a book, a restaurant menu, a train schedule, a posted sign or advertisement, an invoice or bill, a package of food or clothing, or a textbook and the presentation of the textual content in a user-accessible format, such as for example, an auditory format, a Braille format, or a magnified textual format, in the original language or a different language. As described more fully herein, embodiments of the invention may also optionally provide additional features, such as for example, those found in a personal assistant, such as calendaring, email, and note recording functionalities, connectivity to the internet or a cellular network, library and archiving functionalities, direct connectivity with a computer, speaker system, Braille output or input system, or external camera.

Figure 1:
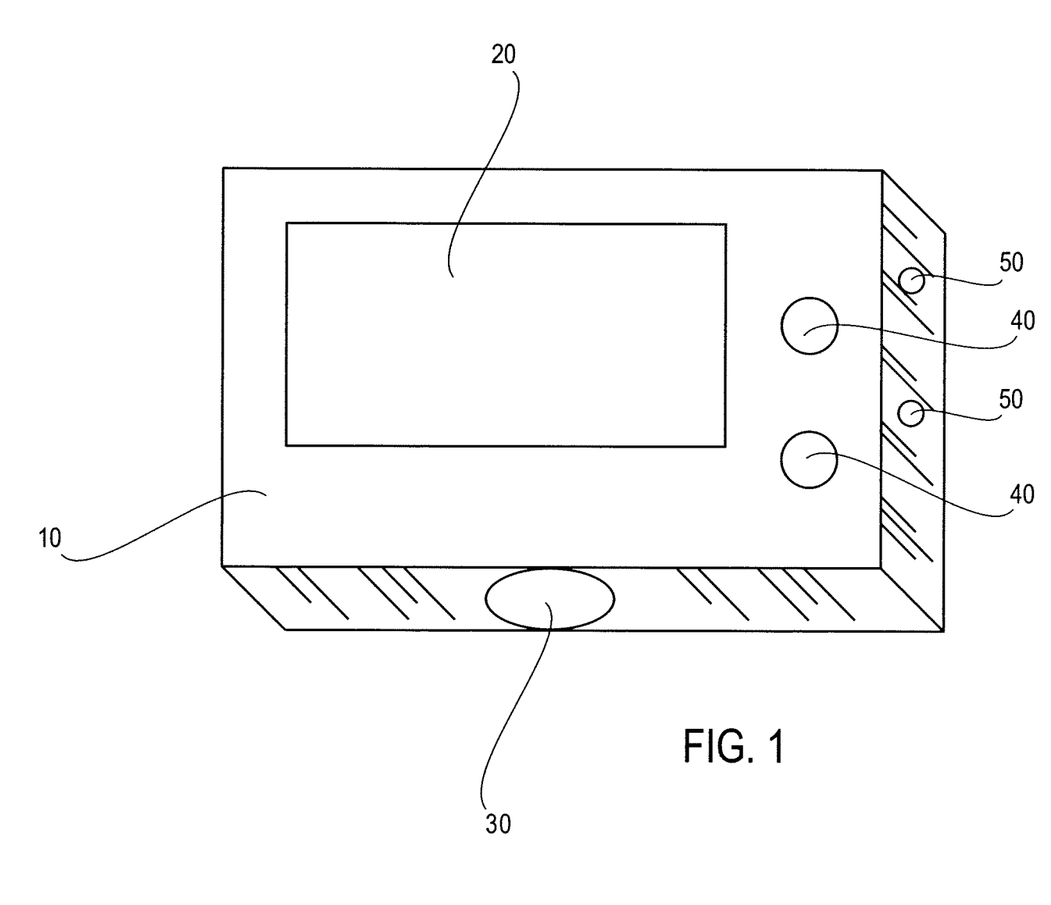
FIG. 1 provides a basic drawing of a device capable of capturing and transforming text images according to embodiments of the invention.
Figure 2:
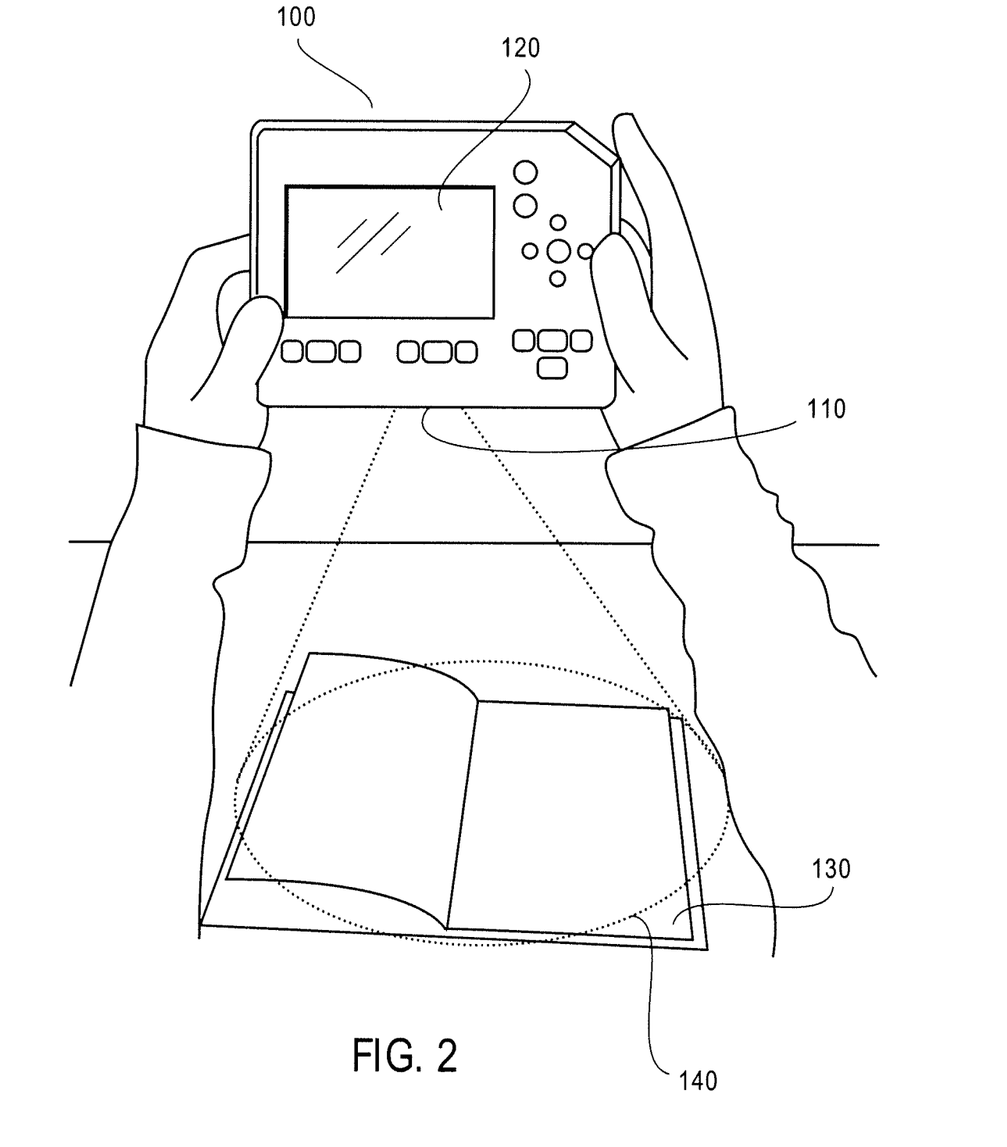
FIG. 2 provides an example of a user employing a device to capture and transform text from a printed medium, such as a magazine or a book.

FIG. 1 provides a drawing of a device according to embodiments of the invention that is capable of capturing an image and providing an output related to the captured image to a user, such as, for example, deciphering the text contained in the image and reading the text aloud to a user. The device of FIG. 1 is a mobile computing device. The device of FIG. 1 has a body 10, user interface or display screen 20, a camera 30, input devices 40, and output devices and or input/output ports 50. Optionally, the user interface screen may be located in a different position and/or be a different relative size to the size of the device. Similarly, the configuration, location, and or number of input devices 40 and output devices or input/output ports 50 located in the body of the device is not fixed at the exemplary arrangement shown and may be varied depending on the use(s) to which the device may be put. An important aspect of this exemplary design, however, is the location of the camera 30 relative to the user interface screen 20. As can be seen from FIG. 1, the camera, and more specifically the camera lens is located in a face that is adjacent to the face of the body in which the interface screen. In the pictured embodiment, the line of sight of the camera lens combination is 90 degrees from the line of sight of the user interface, allowing a user to look at the device screen and image material on a surface below the device simultaneously. In alternate embodiments, the angle formed by the line of site for the camera and the line of site for the user interface screen may be an angle that is less than 170 degrees. The formation of an angle between the lines of site for the user interface screen and the camera that is less than 170 degrees may be accomplished by having a user interface screen that is capable of popping out or being pushed inward from the face of the device in which it is housed to create a comfortable viewing angle. This adjacent-face location enables a user to comfortably and accurately operate the device in a manner, for example, as shown in FIG. 2. In general, the user interface screen or display allows a user to interact with the device. It can be a touch screen, in which the user is able to input information and or a screen that provides information to the user about the device, such as, for example, the operations that the device is currently and or is capable of performing, the information that is stored on the device, and or information that can be obtained from other sources, such as the internet or an external library.

In FIG. 2, a user of a text capture and transformation device 100 having a camera lens 110 (not shown) located in a face adjacent to the face of the device having a user interface screen 120 is capturing text from a book or magazine 130 that has been placed on a table top. As further shown in FIG. 2, a text transformation device 100 may optionally be equipped with a light source (not shown) that is capable of illuminating an area 140 (shown as a dotted line in FIG. 2) from which the camera (not shown) captures an image of an object 130, such as the pages of a book or a magazine. The text transformation device 100 may further optionally contain a mechanism for indicating to a user the metes and bounds of the area from which the device's camera is able to capture an image to aid the user in aligning the device relative to text to be captured. For example, the mechanism may be a light that highlights using continuous or blinking light some or all of the outline of the image capture area.

Figure 3:
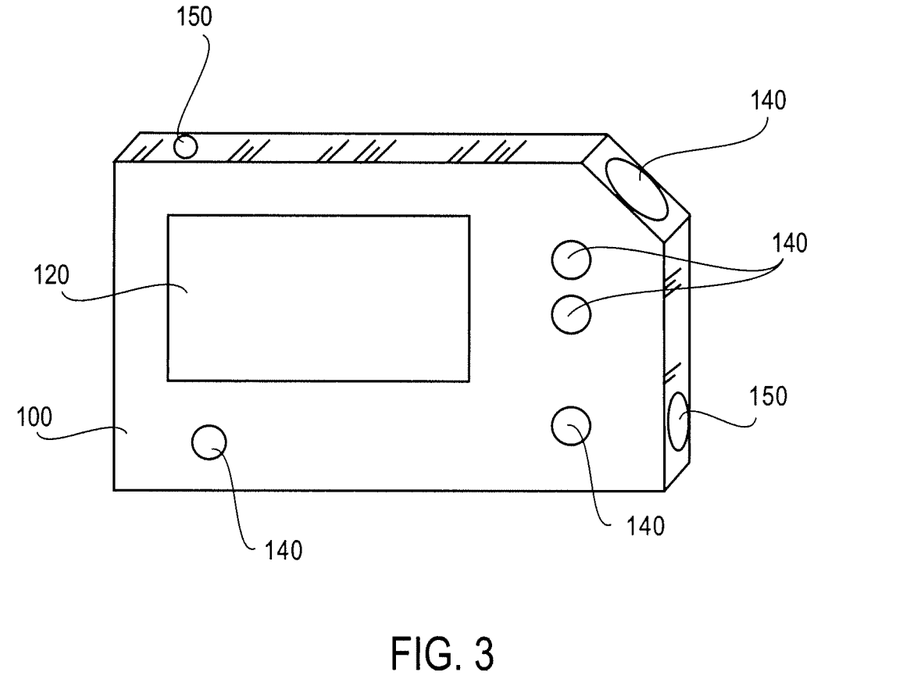
FIG. 3 provides a basic drawing of a second device capable of capturing and transforming text images.

FIG. 3 provides a drawing of a further device according to embodiments of the invention that is capable of capturing an image and providing an output related to the captured image to a user. The device of FIG. 3 has a body 100, user interface screen 120, a camera (not shown), input devices 140, and output devices and or input/output ports 150. Optionally, the user interface screen may be located in a different position and/or be a different relative size to the size of the device. Similarly, the configuration, location, and or number of input 40 and output devices or input/output ports 50 located in the body of the device is not fixed at the exemplary number shown and may be varied depending on the use(s) to which the device may be put. The device shown in FIG. 3 additionally comprises a missing corner, or a cut-out corner, so that the resulting body has seven rather than six sides. To describe the cut-out corner feature further, the body of the text transformation device comprises two parallel faces that are five-sided, and four faces that are four-sided. Importantly, the corner cut-out feature allows a user to quickly orient the text transformation device using the sense of touch and also optionally provides a comfortable location for a manual input device, such as, for example a button that instructs the camera to capture an image when the button is depressed by a user.

Figure 4A:
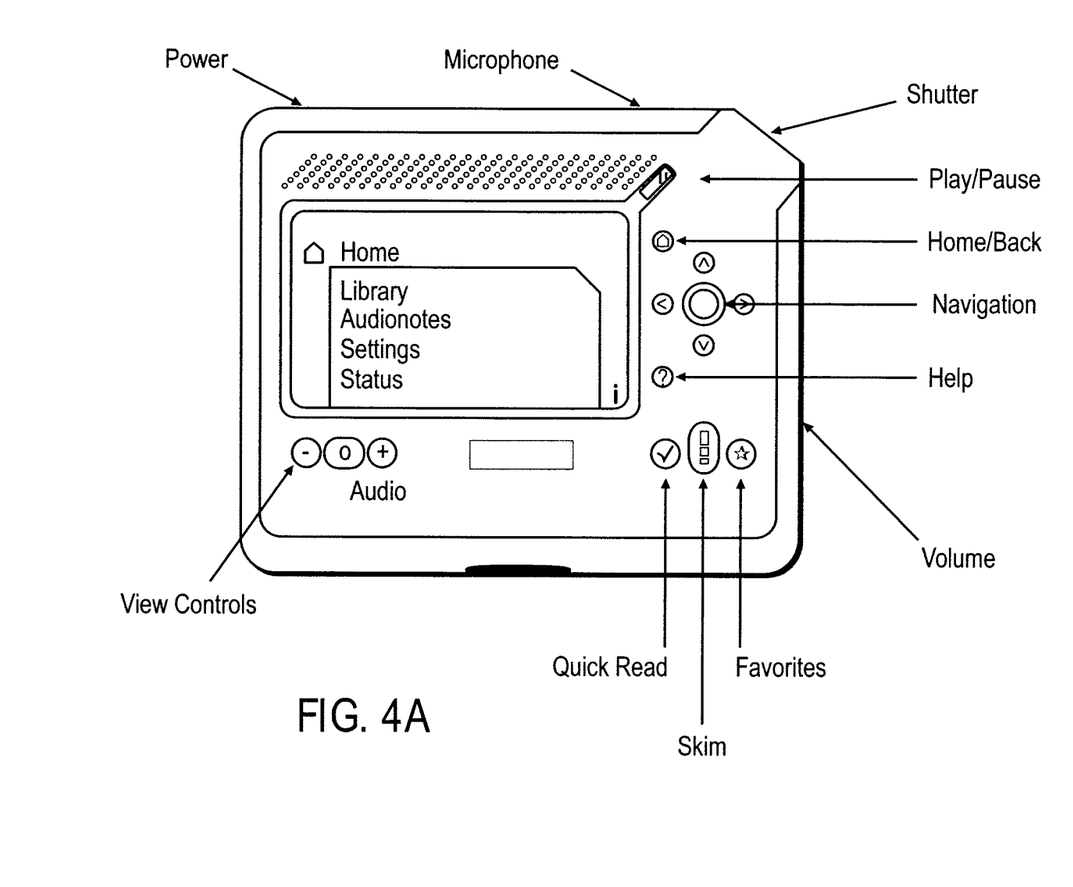
FIGS. 4A and 4B provide a picture of an additional exemplary device capable of capturing and transforming text images.
Figure 4B:
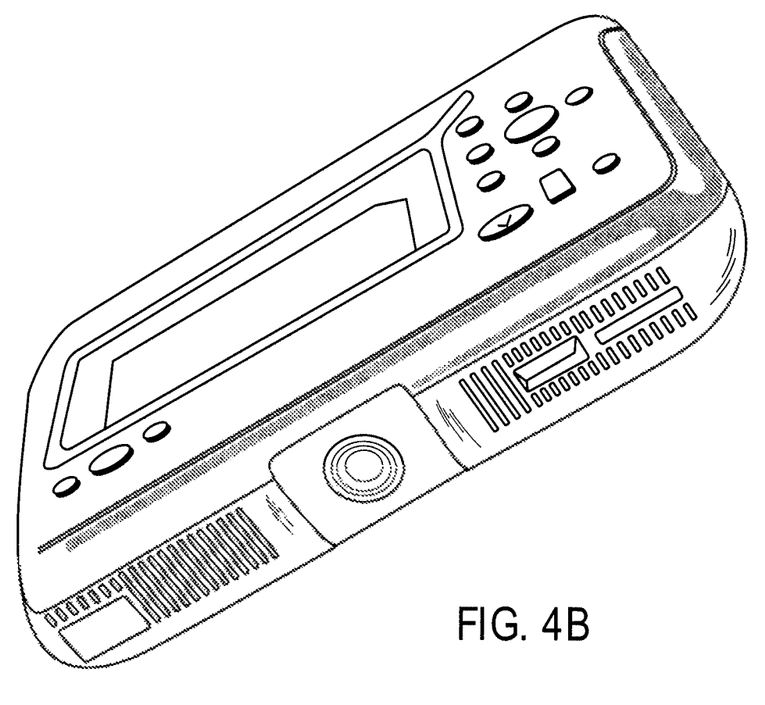

FIGS. 4A and 4B provide pictures of an exemplary device. FIG. 4A provides a view facing the device's user interface screen. In this example, the face of the device containing a user interface screen additionally has input buttons, including navigation buttons that allow a user to navigate through, for example, an operating or a file system or a text that has been captured. FIG. 4B provides a side view of the same exemplary device in which a camera lens is visible. In the device of FIGS. 4A and 4B the line of site for the user interface screen is 90 degrees from the line of site for the camera. Additionally, the device of FIGS. 4A and 4B contains a cut-out corner having a button that operates the device's camera for image capture, as described above in conjunction with FIG. 3. The cut-out corner allows a user, among other things, to quickly orient the device using a sense of touch and capture an image of an object.

Figure 5:
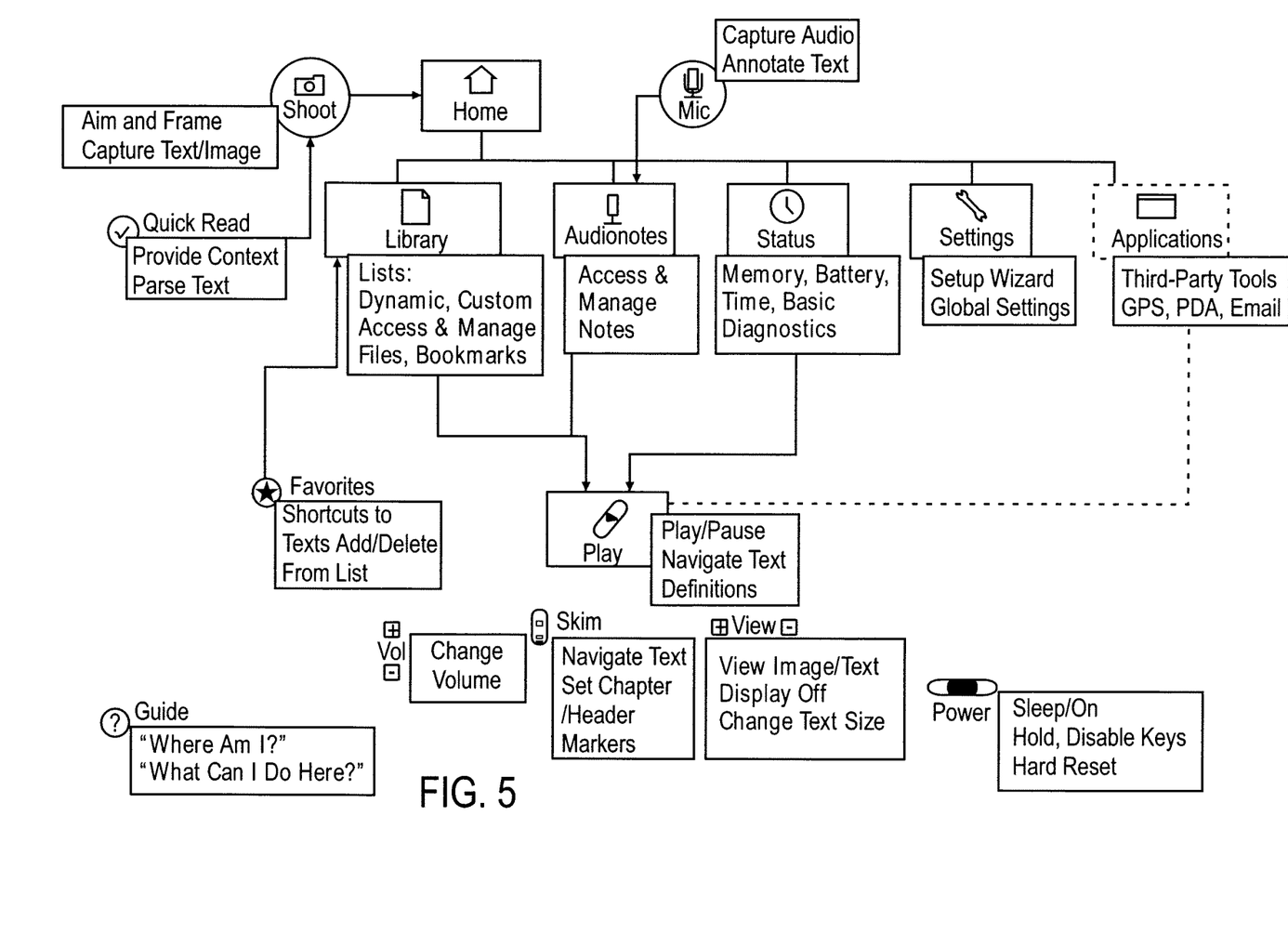
FIG. 5 diagrams optional exemplary functionality that can be provided with a text capture and transformation device.

FIG. 5 diagrams an optional configuration and diagram of capabilities for an exemplary text capture device according to the present invention. For example, a user interface screen may display a home screen from which a library function housing lists that allow dynamic, custom access to files and file management and bookmarks, a notes function that allows access to and management of notes, such as audio notes, a status function that provides information about memory and battery status and performs basic diagnostics, a settings function, and applications folder that provide functions such as GPS, calendaring, and email, can be navigated to. Additionally, from a home screen, functions for allowing text capture (camera aiming and object framing) can be navigated to, allowing a user quick access to text content. Functions may be controlled by input devices, such as navigation buttons, and play and volume buttons. Additional input buttons or devices may be provided that allow a user to access help functions, navigate and skim text, change volume associated with output, such as through headphones or speakers, or increase the size of text displayed.

A display or a user interface screen may comprise any suitable display unit for displaying information appropriate for a mobile computing device. A display may be used by the invention to display, for example, file trees and text, and to assist with input into the text capture device. Input devices include, for example, typical device controls, such as volume controls, recording and playback controls, and navigation buttons. Examples for input/output (I/O) device(s) include an alphanumeric keyboard, a numeric keypad, a touch pad, input keys, buttons, switches, rocker switches, microphones, a speaker, Braille input pads or boards, cameras, and voice recognition device and software. Information entered by way of a microphone may be digitized by a voice recognition device. Navigation buttons can comprise an upward navigation button, a downward navigation button, a leftward navigation button, and a rightward navigation button. Navigation buttons also may comprise a select button to execute a particular function.

Embodiments of the invention provide mobile or portable computing devices. A mobile computing device may refer to any device having a processing system, a memory, and a mobile power source or supply, such as one or more batteries or solar cells, for example. Although a number of functionalities are discussed herein, embodiments of the present invention are not so limited and additional functionalities are possible, such as those commonly available with a laptop computer, ultra-laptop computer, portable computer, handheld computer, palmtop computer, personal digital assistant (PDA), cellular telephone, combination cellular telephone/ PDA, smart phone, pager, one-way pager, two-way pager, messaging device, data communication device, and or a music player (such as a mp3 player). Such functionalities include, for example, an ability to store, catalogue, and play music, to send and or receive text messages, to send and receive email, to store and access lists of contacts and important personal information, and an ability to calendar important dates and appointments. Additional functionalities include, the ability to connect to the internet with either a hard connection or a wireless connection. Access to the internet allows the device, for example, to search the internet to determine if the text being translated has already been decoded into an audio format.

In general, transformation, deciphering, and decoding mean capturing text, language, and or forms of communication in one format or medium and storing or outputting it in a different medium or format. For example, a device according to the present invention may capture text from a printed source, such as for example, a book, a magazine, a food package, a letter, a bill, a form of monetary currency, a class syllabus, a sign, a notice, a durable good package, an instruction sheet or pamphlet, and translate it into digital a file stored in memory, an auditory signal such as, a voice that reads the text contained in the printed source to a user, an output on a computer screen, or a Braille output device. Additional output devices include for example, an internal speaker, an amplifier, jack, or connection for headphones or for external speakers. Optionally, the decoding and transformation function may be further augmented by software that, for example, is capable of recognizing a particular type of document that is frequently referred to, such as for example, a bus schedule, a restaurant menu, a check or bank draft, or monetary forms (currency). In the case of currency, the ability to recognize the object as currency enables the device to quickly inform the user about the most relevant information, the currency's denomination (e.g., a one dollar bill or a twenty dollar bill) or the value on a bank draft. The object recognition may occur as a result of a user input or as a result of a software-driven object recognition process. In general, the ability to recognize an object allows the text transformation device to tailor its output to immediately include the information that is most relevant to the user. For example, in the case of currency, the user may desire to know quickly know the denomination rather than waiting for the device to capture all the text and output the text found on the currency (object) in a linear fashion. Image recognition capabilities are available through commercial software solutions, for example. Further, the device may be equipped with capabilities that allow the user to scan larger print or bold type in a text to search for articles or information that they are interested in, or that allows a user to quickly scan a label to look for certain nutritional information. For example, scanning for larger, differentially colored, italicized, or bold-faced type allows the user to quickly jump to sections of a menu, newspaper, or magazine that the user might be interested in, rather than having the device output text content in a linear fashion.

Embodiments of the invention comprise an imaging system that is configured to capture an image digitally for subsequent OCR processing of text contained within the image. As used herein, the term capture or capturing refers to capturing a video stream or photographing an image and is to be distinguished from scanning across the surface of an object to capture an image of the object. For example, scanning can involve placing the printed material to be recorded flat against a glass surface an having a scanner behind the glass scan the object or drawing a scanning device across the surface of a page. Advantages associated with capturing a text-based image via digital photography, as opposed to scanning, include greater ease of use and adaptability. Unlike with a scanner, the imaging device need not be placed flush against the surface to be imaged, thereby allowing the user the freedom and mobility to hold the imaging device at a distance from the surface, e.g., at a distance that is greater than a foot from the page of a book. Thus, such an imaging device is adaptable enough for imaging uneven surfaces such as a pill bottle or an unfolded restaurant menu, as well as substantially planar surfaces such as a street sign. Accordingly, some embodiments of the invention can capture images from both planar and non-planar objects. Capturing the image in such a manner allows for rapid acquisition of the digital images and allows for automated or semi-automated page turning.

Optionally, the imaging system includes a power source (such as, for example, one or more batteries, alternating or direct current acceptance capability, and solar cells), a plurality of lenses, a level detection mechanism, a zoom mechanism, a mechanism for varying focal length, an auto focus mechanism, a mechanism for varying aperture, a video capture unit, such as those employed in closed-circuit television cameras, and a shutter. An optional color sensor within the text capture device allows for the sensing of color present in an image that is captured. The sensing of color allows additional information to be obtained, such as for example, if the title and headings or certain features of a textual display are present in different colors, the text can be more rapidly sorted and desired information presented to the user. Further possible components include for example, a LED strobe, to facilitate image capture at distances less than 12 inches from the device, a xenon lamp, to facilitate image capture at distances greater than 12 inches from the device, headphone jacks and headphones, stereo speakers, connectivity options, such as USB OTG (universal serial bus on the go), and docking, remote control connections, targeting and aiming lights (that, for example, indicate with light the image capture area so that the user can align the device to capture the desired text), microphones, and power cables.

To optimize the quality of the captured image, embodiments optionally include a level detection mechanism that determines whether the imaging device is level to the surface being imaged. Any level detection mechanisms known in the art may be used for this purpose. The level detection mechanism communicates with an indicator that signals to the user when the device is placed at the appropriate angle (or conversely, at an inappropriate angle) relative to the surface being imaged. The signals employed by the indicator may be visual, audio, or tactile. Some embodiments include at least one automatically adjustable lens and or mirror that can tilt at different angles within the device so as to be level with the surface being imaged and compensate for user error.

To avoid image distortion at close range, embodiments may optionally include a plurality of lenses, one of which is a MACRO lens, as well as a zoom mechanism, such as digital and/or optical zoom. In certain embodiments, the device includes a lens operating in Bragg geometry, such as a Bragg lens. Embodiments can include a mechanism for varying the focal length and a mechanism for varying the aperture within predetermined ranges to create various depths of field. The image system is designed to achieve broad focal depth for capturing text-based images at varying distances from the imaging device. Thus, the device is adaptable for capturing objects ranging from a street sign to a page in a book. The minimum focal depth of the imaging device corresponds to an f-stop 5.6, according to certain embodiments. In some embodiments, the imaging device has a focal depth of f-stop 10 or greater.

In certain embodiments, the imaging device provides a shutter that is either electrical or mechanical, and further provides a mechanism for adjusting the shutter speed within a predetermined range. In some embodiments, the imaging device has a minimum shutter speed of $\frac{1}{60}$ths. In other embodiments, the imaging device has a minimum shutter speed of $\frac{1}{125}$ths. Certain embodiments include a mechanism for varying the ISO speed of the imaging device for capturing text-based images under various lighting conditions. In some embodiments, the imaging device includes an image stabilization mechanism to compensate for a user's unsteady positioning of the imaging device.

In addition to the one-time photographic capture model, some embodiments further include a video unit for continuous video capture. For example, a short clip of the image can be recorded using the video capture unit and processed to generate one master image from the composite of the video stream. Thus, an uneven surface, e.g., an unfolded newspaper which is not lying flat, can be recorded in multiple digital video images and accurately captured by slowly moving the device over the surface to be imaged. A software component of the imaging system can then build a final integrated composite image from the video stream for subsequent OCR processing to achieve enhanced accuracy. Similarly, a streaming video input to the imaging system can be processed for subsequent OCR processing. Software that performs the above described function is known in the art. Accordingly, both planar and non-planar objects can be imaged with a video unit employing continuous video capture.

Additionally, some embodiments include one or more light sources for enhancing the quality of the image captured by the device. Light sources known in the art can be employed for such a purpose. For example, the light source may be a FLASH unit, an incandescent light, or an LED light. In some embodiments, the light source employed optimizes contrast and reduces the level of glare. In one embodiment, the light source is specially designed to direct light at an angle that is not perpendicular to the surface being imaged for reducing glare.

In some embodiments, the image capturing system further includes a processor and software-implemented image detectors and filters that function to optimize certain visual parameters of the image for subsequent OCR processing. To optimize the image, especially images that include colored text, for subsequent OCR processing, some embodiments further include a color differential detection mechanism as well as a mechanism for adjusting the color differential of the captured image.

In some embodiments, the imaging system further includes CMOS image sensor cells. To facilitate users with unsteady hands and avoid image distortion, handheld embodiments further include an image stabilization mechanism, known by those of ordinary skill in the art.

The system can include a user interface comprising a number of components such as volume control, speakers, headphone/headset jack, microphone, and display. The display may be a monochromatic or color display. In some embodiments, an LCD display having a minimum of 640×480 resolution is employed. The LCD display may also be a touch screen display. According to certain embodiments, the user interface includes a voice command interface by which the user can input simple system commands to the system. In alternative embodiments, the system includes a Braille display to accommodate visually impaired users. In still other embodiments, the Braille display is a peripheral device in the system.

OCR systems and text reader systems are well-known and available in the art. Examples of OCR systems include, without limitation, FineReader (ABBYY), OmniPage (Scansoft), Envision (Adlibsoftware), Cuneiform, PageGenie, Recognita, Presto, TextBridge, amongst many others. Examples of text reader systems include, without limitation, Kurzweil 1000 and 3000, Microsoft Word, JAWS, eReader, WriteOutloud, ZoomText, Proloquo, WYNN, Window-Eyes, and Hal. In some embodiments, the text reader system employed conforms with the DAISY (Digital Accessible Information System) standard.

In some embodiments, the handheld device includes at least one gigabyte of FLASH memory storage and an embedded computing power of 650 mega Hertz or more to accommodate storage of various software components described herein, e.g., plane detection mechanism, image conditioners or filters to improve image quality, contrast, and color, etc. The device may further include in its memory a dictionary of words, one or more translation programs and their associated databases of words and commands, a spellchecker, and thesaurus. Similarly, the handheld device may employ expanded vocabulary lists to increase the accuracy of OCR with technical language from a specific field, e.g., Latin phrases for the practice of law or medicine or technical vocabularies for engineering or scientific work. The augmentation of the OCR function in such a manner to recognize esoteric or industry-specific words and phases and to account for the context of specialized documents increases the accuracy of the OCR operation.

In still other embodiments, the handheld device includes a software component that displays the digital text on an LCD display and highlights the words in the text as they are read aloud. For example, U.S. Pat. No. 6,324,511, the disclosure of which is incorporated by reference herein, describes the rendering of synthesized speech signals audible with the synchronous display of the highlighted text.

The handheld device may further comprise a software component that signals to the user when the end of a page is near or signals the approximate location on the page as the text is being read. Such signals may be visual, audio, or tactile. For example, audio cues can be provided to the user in the form of a series of beeps or the sounding of different notes on a scale. Signaling to the user that the end of the page provides a prompt for the user to turn the page, if manual page-turning is employed.

The handheld device may further include a digital/video magnifier. Examples of digital magnifiers available in the art include Opal, Adobe, Quicklook, and Amigo. In certain embodiments, the digital/video magnifier transfers the enlarged image of the text as supplementary inputs to the OCR system along with the image(s) obtained from the image capturing system. In other embodiments, the magnifier functions as a separate unit from the rest of the device and serves only to display the enlarged text to the user.

In various embodiments, the devices of the present invention may be implemented as wireless systems, wired systems, or a combination of both. When implemented as a wireless system, transformation devices may include components and interfaces suitable for communicating over a wireless shared media, such as one or more antennas, transmitters, receivers, transceivers, amplifiers, filters, control logic, and so forth. An example of wireless shared data may include portions of a wireless spectrum, such as the RF spectrum and so forth. Examples of wireless communication methods include, Bluetooth, ZigBee, wireless local area networks (WLAN), Wi-Fi (WLAN based on IEEE 802.11 specifications), Wi-Pro, WiMax, and GPS (global positioning systems). When implemented as a wired system, a transformation device may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Certain embodiments further include a data port for data transfer, such as transfer of images, from the system to a computing station. For example, the data port can be a USB 2.0 slot for wired communication with devices, and or communication may be wirelessly-enabled with 802.11a/b/g/n (Wi-Fi) standards, and or using a infrared (IR) port for transferring image data to a computing station. Still another embodiment includes a separate USB cradle that functions as a battery charging mechanism and/or a data transfer mechanism. Still other embodiments employ Bluetooth radio frequency or a derivative of Ultra Wide Band for data transfer.

Figure 6:
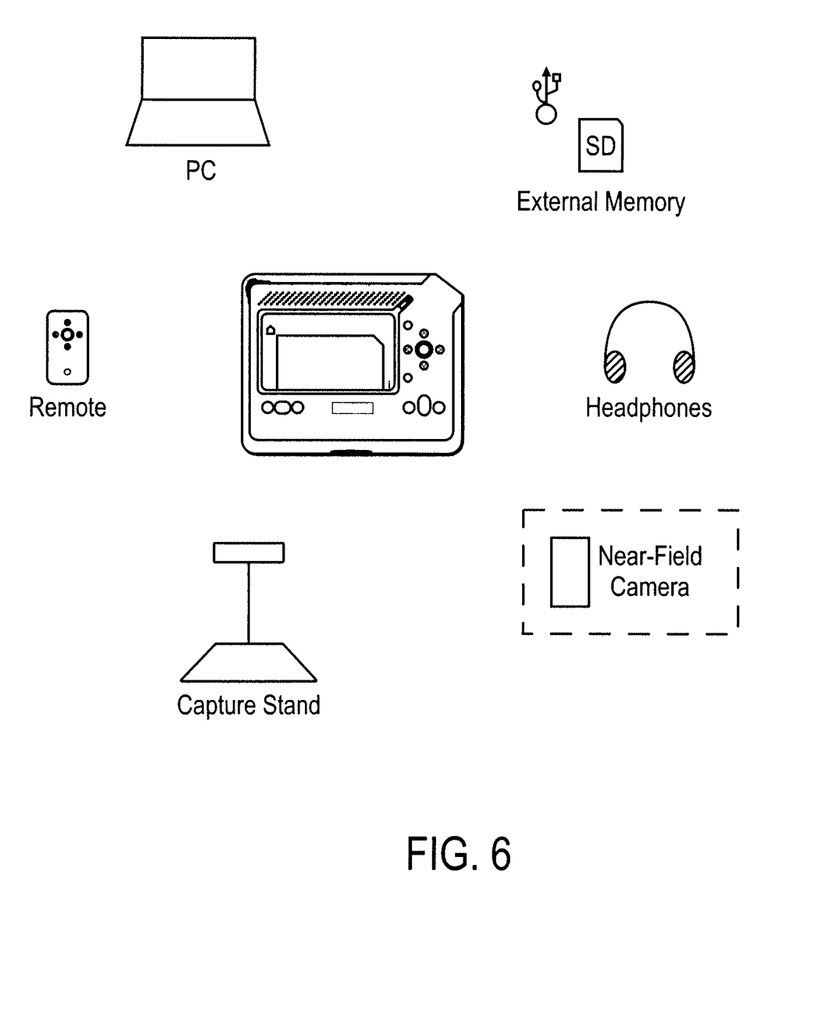
FIG. 6 provides a diagram showing several exemplary peripheral devices that may optionally be used in conjunction with a text capture and transformation device.
Figure 7:
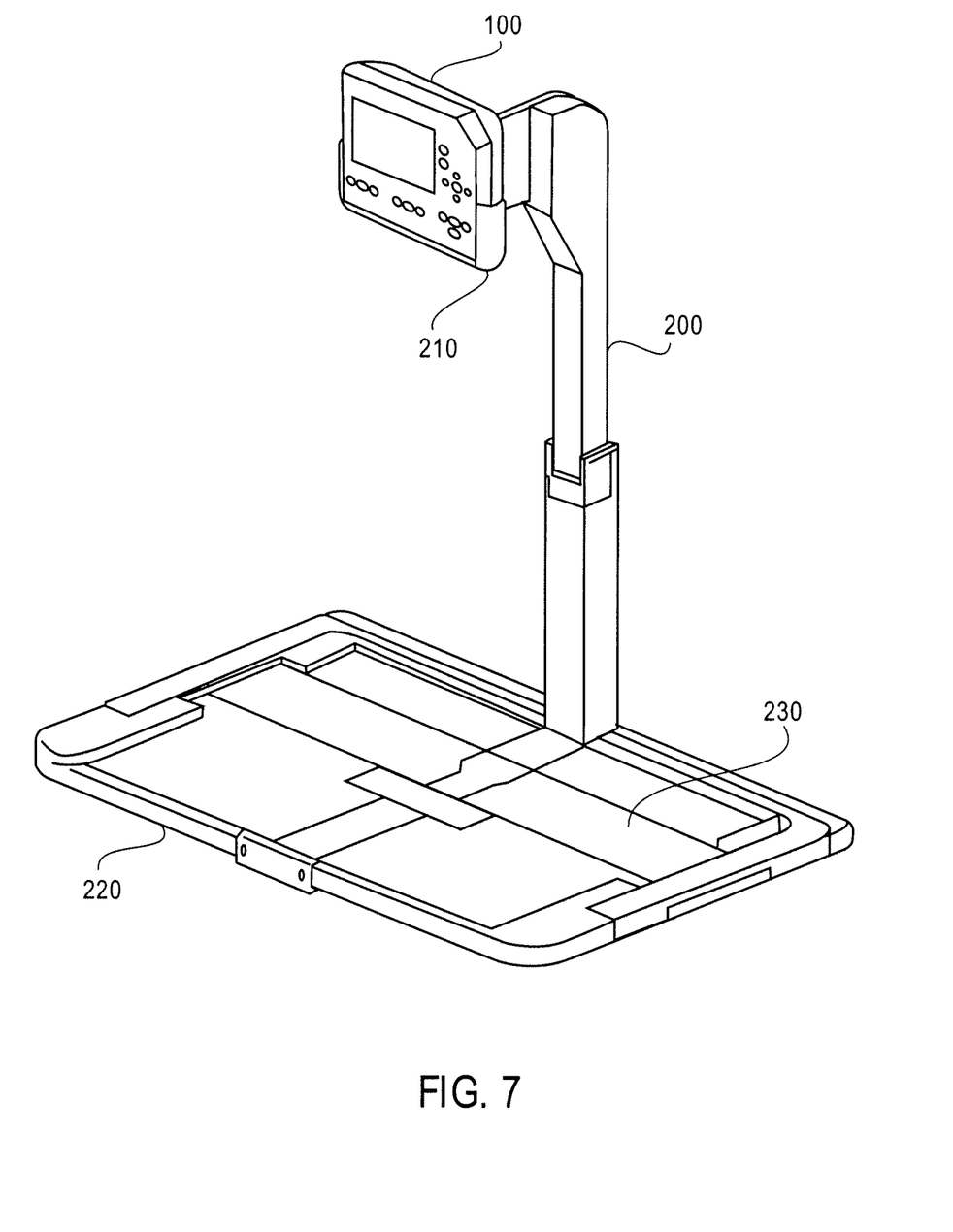
FIG. 7 provides a drawing of an exemplary stand and holder apparatus adapted to hold and position the text capture and transformation device above a text source that may optionally be used in conjunction with a text capture and transformation device.

FIG. 6 provides some exemplary peripherals and modes of operation that are useful with devices of the present invention. For example, the present invention may be connected to a personal computer (a PC) to allow software updates, new software to be added, and or data and files to be stored on or transferred to the computer. The device may also be connected to external devices having memory capability in order to store and or archive the contents of the text transformation device. The text transformation device might be connected to head phones, speakers, or other types of sound-output devices that allow text to be read to the user or auditory prompts to be amplified or heard privately. A remote may also be used to control the functionality of the device. A stand may be used to position the device above a text to be captured. An exemplary stand is shown in FIG. 7. A stand is useful, for example, for capturing multiple pages of a book in succession.

FIG. 7 provides an exemplary apparatus for holding and or positioning text capture device 100. The stand of FIG. 7 has collapsible arm 200, a mechanism for holding the text capture device 100, and is attached to a foldable book plate 220. A portable imaging device 100 can be docked using docking mechanism of the holding device 210. The collapsible arm 200 and book frame 220 allows for the imaging device to be placed at an optimal distance from a book or other object for image capture by the device. The stand may also include a holding strip 230 for holding down the pages of a book or magazine. The system includes modules for OCR processing and for converting the digital text to speech. In certain embodiments, the system includes a mechanism for determining whether a page has been turned by comparing the text from the two pages or by responding to a manual input from the user engaging the digital shutter. Some embodiments include a display screen for displaying the digital text. In yet other embodiments, a Braille machine is included for outputting the digital text. The text capture device may also include an output to alert the user that the image capture is complete for the object and the page should be turned.

An optional automatic page turner and page holder are respectively coupled to the housing and the image capturing system positioned opposite the slot where the book is to be placed. Automatic page turners are well known and available in the art. See U.S. 20050145097, U.S. 20050120601, Sure-Turn™ Advanced Page Turning Technology (Kirtas Technologies), the disclosures of which are incorporated herein by reference in their entirety. Pages may be turned in response to an automated signal from the transformation device or from a signal from a user. In addition, the device can be employed without an automated page turner, instead, relying on the user to turn pages of a book.

Figure 8A:
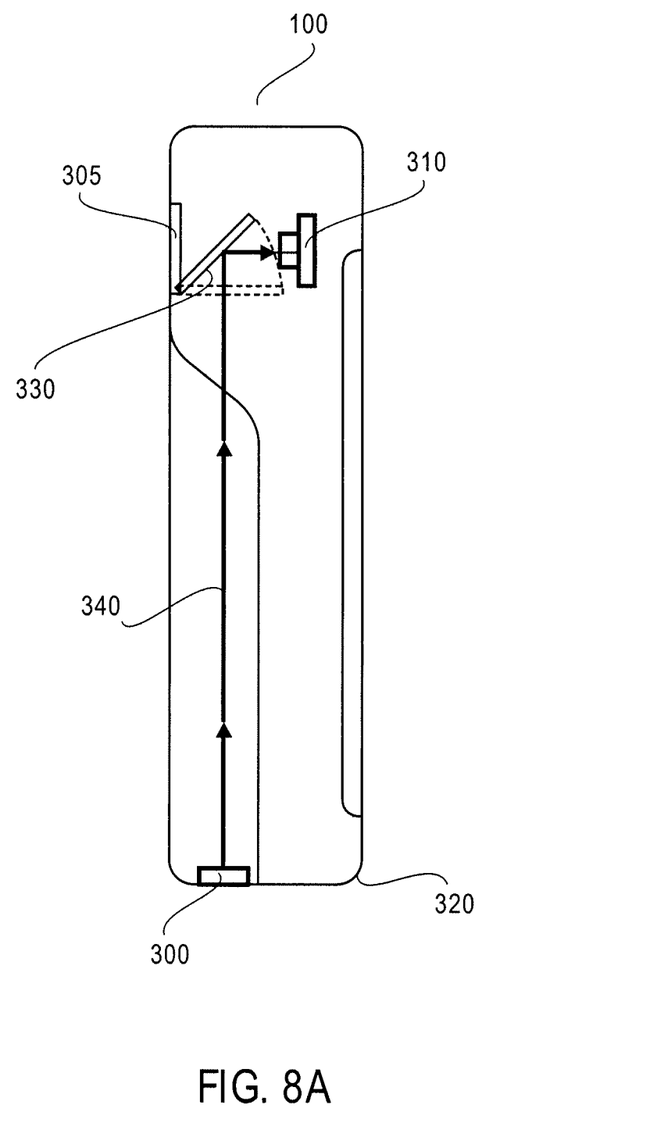
FIGS. 8A and 8B show an exemplary text capture and transformation device having two lenses through which a camera internal to the device can capture images.
Figure 8B:
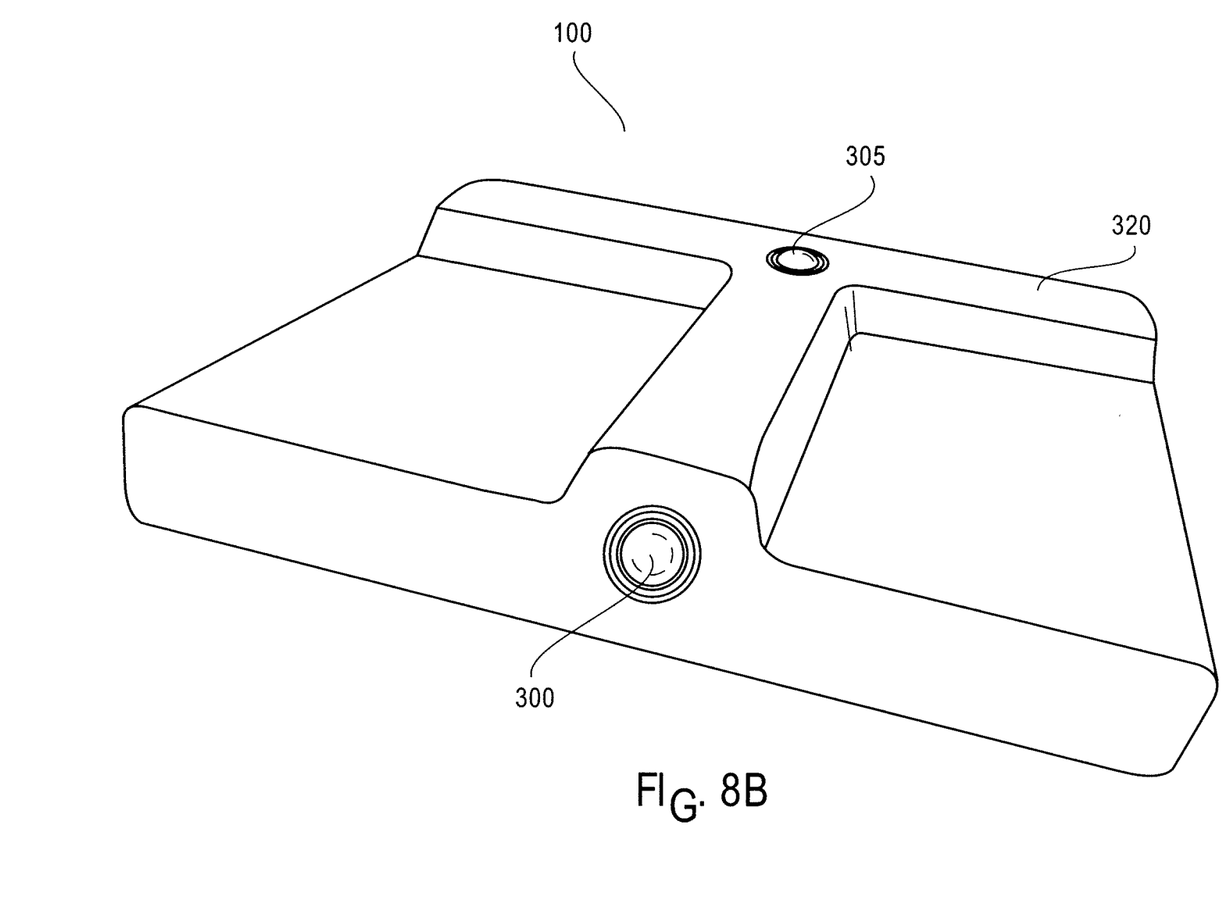

FIGS. 8A and 8B provide a further alternate configuration for the text capture device 100 of the present invention. The device of FIGS. 8A and 8B has two lenses 300 and 305 through which a camera 310 housed within the body 320 of the device may capture an image. In FIG. 8A, light 340 entering lens 300 is focused on the camera 310 aperture by mirror 330. When the device captures an image through lens 305, the mirror 330 is rotated out of the way (as indicated by dashed lines) and the light entering lens 305 (not shown) reaches the camera 310 aperture. The rotation may be simply accomplished by weighting the mirror and allowing gravity to rotate the mirror out of the way, and or a mechanical computer or user-controlled (override) mechanism for mirror movement may be employed. FIG. 8B shows an exemplary housing 320 for the text capture device of FIG. 8A. The housing of FIG. 8B has a raised region associated with the positioning of lenses 300 and 305. The raised regions aid the user in quickly manually orienting the device to perform text capture operations through tactile cues.

Some of the figures accompanying the description of the present invention may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments or aspects of embodiments may be implemented, for example, using a machine-readable or computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

We claim:

1. A device for processing text, comprising:
    a housing having a first face, a second face, and a third face, the first face comprising a user interface screen and the second face comprising a first lens through which one or more cameras located in the housing are configured to capture at least one image of an object located outside the housing, wherein a line of sight of the first lens makes an angle with a line of sight of the user interface screen and wherein the housing is adapted to house the first face and the second face such that the angle remains less than 170 degrees, and
    the third face comprising a second lens through which the one or more cameras located in the housing are configured to capture at least one image of an object located outside the housing, wherein the housing is adapted to house the second face and the third face such that an angle between the second face and the third face is substantially 90 degrees,
    wherein the device switches between the first lens and the second lens to capture at least one image of an object located outside the housing by rotating a mirror adjacent to the one or more cameras, the rotation of the mirror is achieved by weighting the mirror and allowing gravity to rotate the mirror;
    an optical character recognition system configured to recognize text from the at least one image captured by the one or more cameras; and
    a text reader configured to output the recognized text via an output format, wherein the output format is a Braille display, an audible signal, and/or a text display.

2. The device according to claim 1, the device further comprising a level detector configured to determine whether the first or second lens is level to a surface of the object from which text is to be captured.

3. The device according to claim 1, the device further comprising a color differential detector configured to optimize the at least one image for deciphering text contained in the at least one image.

4. The device according to claim 1, the device further comprising a light source configured to illuminate the object from which the at least one image is to be captured.

5. The device according to claim 1, the device further comprising a light configured to indicate a region outside the device from which the one or more cameras are configured to capture the at least one image.

6. The device according to claim 1, wherein the angle between the line of sight of the first lens and the line of sight of the user interface screen is 90 degrees.

7. The device according to claim 1, wherein the angle between the line of sight of the second lens and the line of sight of the user interface screen is 180 degrees and the line of sight of the first lens and the line of sight of the user interface screen is 90 degrees.

8. The device of claim 1, wherein the housing is adapted to house the first face and the second face such that the angle made by the line of sight of the first lens and the line of sight of the user interface screen remains at 90 degrees.

9. A device for processing text, comprising:
    a housing comprising at least seven faces, wherein one face forms at least one oblique angle with another of the seven faces, a first face comprising a user interface screen and a second face comprising a first lens through which a camera located in the housing is configured to capture at least one image of an object located outside the housing, and wherein a line of sight of the first lens makes an angle with a line of sight of the user interface screen and the angle is less than 170 degrees, a third face comprising a second lens through which the camera located in the housing is configured to capture at least one image of an object located outside the housing,
    wherein the device switches between the first lens and the second lens to capture at least one image of an object located outside the housing by rotating a mirror adjacent to the camera, the rotation of the mirror is achieved by weighting the mirror and allowing gravity to rotate the mirror;
    an optical character recognition system configured to recognize text from the at least one image captured by the camera; and
    a text reader configured to output the recognized text via an output format.

10. The device according to claim 9, wherein the output format is a Braille display, an audible signal, and/or a text display.

11. The device according to claim 9, the device further comprising a level detector configured to determine whether the first or second lens is level with a surface of the object from which text is to be captured.

12. The device according to claim 9, the device further comprising a color differential detector configured to optimize the at least one image for deciphering the text contained in the at least one image.

13. The device according to claim 9, the device further comprising a light source configured to illuminate the object from which the at least one image is to be captured.

14. The device according to claim 9, wherein the angle between the line of sight of the first lens and the line of sight of the user interface screen is 90 degrees.

15. The device according to claim 9, wherein the housing is configured to house a plurality of cameras.

16. The device according to claim 9, wherein the one face has an area that is less than half an area of any other face, wherein the one face having an area that is less than half the area of any other face comprises a switch that when manually activated by a user causes the camera to capture an image of an object.

17. The device of claim 9, wherein the housing further comprises a mirror that is located adjacent to the camera, wherein the lens through which the camera is configured to capture the at least one image is determined by rotating the mirror.

18. A device for processing text, comprising:
- a housing having a first face, a second face, and a third face, the first face comprising a user interface screen and the second face comprising a first lens through which a camera located in the housing is configured to capture at least one image of an object located outside the housing, and wherein a line of sight of the first lens makes an angle with a line of sight of the user interface screen and wherein the housing is adapted to house the first face and the second face such that the angle remains fixed at substantially 90 degrees, the third face comprising a second lens through which the camera located in the housing is configured to capture at least one image of an object located outside the housing,
- wherein the device switches between the first lens and the second lens to capture at least one image of an object located outside the housing by rotating a mirror adjacent to the camera, the rotation of the mirror is achieved by weighting the mirror and allowing gravity to rotate the mirror;
- an optical character recognition system configured to recognize text from the at least one image captured by the camera; and
- a text reader configured to output the recognized text via an audio, Braille, and/or visual format.

* * * * *